United States Patent
Hall et al.

(10) Patent No.: US 11,740,075 B2
(45) Date of Patent: *Aug. 29, 2023

(54) DYNAMIC ADJUSTMENT OF STRUCTURED LIGHT FOR DEPTH SENSING SYSTEMS BASED ON CONTRAST IN A LOCAL AREA

(71) Applicant: META PLATFORMS TECHNOLOGIES, LLC, Menlo Park, CA (US)

(72) Inventors: Michael Hall, Bellevue, WA (US); Xinqiao Liu, Medina, WA (US); Zhaoming Zhu, Redmond, WA (US); Rajesh Lachhmandas Chhabria, San Jose, CA (US); Huixuan Tang, Redmond, WA (US); Shuochen Su, Seattle, WA (US); Zihe Gao, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,004

(22) Filed: Oct. 18, 2021

(65) Prior Publication Data

US 2022/0036571 A1    Feb. 3, 2022

Related U.S. Application Data

(63) Continuation of application No. 16/415,202, filed on May 17, 2019, now Pat. No. 11,182,914.

(Continued)

(51) Int. Cl.
*G06T 7/521* (2017.01)
*G01B 11/22* (2006.01)
(Continued)

(52) U.S. Cl.
CPC .......... *G01B 11/2513* (2013.01); *G01B 11/22* (2013.01); *G02B 27/0172* (2013.01);
(Continued)

(58) Field of Classification Search
None
See application file for complete search history.

(56) References Cited

U.S. PATENT DOCUMENTS 9,165,211 B2  10/2015  Rhee et al.
10,250,871 B2  4/2019  Ciurea et al.
(Continued)

FOREIGN PATENT DOCUMENTS

| JP | 2010091491 A | 4/2010 |
| JP | 2017191083 A | 10/2017 |
| WO | 2017079458 A1 | 5/2017 |

OTHER PUBLICATIONS

International Preliminary Report on Patentability for International Application No. PCT/US2019/033129, dated Dec. 3, 2020, 8 pages.

(Continued)

*Primary Examiner* — Tahmina N Ansari
(74) *Attorney, Agent, or Firm* — Fenwick & West LLP

(57) ABSTRACT

A depth camera assembly (DCA) determines depth information. The DCA projects a dynamic structured light pattern into a local area and captures images including a portion of the dynamic structured light pattern. The DCA determines regions of interest in which it may be beneficial to increase or decrease an amount of texture added to the region of interest using the dynamic structured light pattern. For example, the DCA may identify the regions of interest based on contrast values calculated using a contrast algorithm, or based on the parameters received from a mapping server including a virtual model of the local area. The DCA may selectively increase or decrease an amount of texture added (Continued)

by the dynamic structured light pattern in portions of the local area. By selectively controlling portions of the dynamic structured light pattern, the DCA may decrease power consumption and/or increase the accuracy of depth sensing measurements.

20 Claims, 10 Drawing Sheets

Related U.S. Application Data

(60) Provisional application No. 62/674,430, filed on May 21, 2018.

(51) Int. Cl.

| | | |
|---|---|---|
| *G01B 11/25* | (2006.01) | |
| *G06T 7/529* | (2017.01) | |
| *G02B 27/01* | (2006.01) | |
| *G06T 7/11* | (2017.01) | |
| *G06T 7/174* | (2017.01) | |
| *G06T 7/55* | (2017.01) | |
| *G06T 7/00* | (2017.01) | |
| *G06T 7/90* | (2017.01) | |
| *H04N 13/106* | (2018.01) | |
| *H04N 13/204* | (2018.01) | |
| *G06T 7/593* | (2017.01) | |
| *H04N 13/128* | (2018.01) | |
| *H04N 13/271* | (2018.01) | |
| *H04N 13/239* | (2018.01) | |
| *H04N 23/56* | (2023.01) | |
| *G06V 10/22* | (2022.01) | |
| *G06V 10/145* | (2022.01) | |
| *H04N 13/00* | (2018.01) | |

(52) U.S. Cl.
CPC ............... *G06T 7/11* (2017.01); *G06T 7/174* (2017.01); *G06T 7/521* (2017.01); *G06T 7/529* (2017.01); *G06T 7/55* (2017.01); *G06T 7/593* (2017.01); *G06T 7/90* (2017.01); *G06T 7/97* (2017.01); *G06V 10/145* (2022.01); *G06V 10/22* (2022.01); *H04N 13/106* (2018.05); *H04N 13/128* (2018.05); *H04N 13/204* (2018.05); *H04N 13/239* (2018.05); *H04N 13/271* (2018.05); *H04N 23/56* (2023.01); *G02B 2027/014* (2013.01); *G02B 2027/0138* (2013.01); *G02B 2027/0178* (2013.01); *G06T 2207/10028* (2013.01); *H04N 2013/0081* (2013.01)

(56) References Cited

U.S. PATENT DOCUMENTS

| | | |
|---|---|---|
| 10,360,462 B2 | 7/2019 | Koishi et al. |
| 10,362,296 B2 * | 7/2019 | Price ................ H04N 13/139 |
| 10,424,073 B2 | 9/2019 | Karino |
| 10,708,577 B2 | 7/2020 | Trail |
| 2002/0080998 A1 | 6/2002 | Matsukawa et al. |
| 2006/0280360 A1 | 12/2006 | Holub |
| 2009/0129667 A1 | 5/2009 | Ho et al. |
| 2009/0244263 A1 | 10/2009 | Saito |
| 2010/0091301 A1 | 4/2010 | Masuda |
| 2010/0142852 A1 | 6/2010 | Fujita et al. |
| 2010/0246896 A1 | 9/2010 | Saito |
| 2011/0285826 A1 | 11/2011 | Bickerstaff et al. |
| 2013/0010073 A1 | 1/2013 | Do et al. |
| 2013/0141575 A1 | 6/2013 | Lee et al. |
| 2013/0169800 A1 | 7/2013 | Mori |
| 2014/0002612 A1 | 1/2014 | Morioka et al. |
| 2014/0003704 A1 | 1/2014 | Liao et al. |
| 2014/0028804 A1 | 1/2014 | Usuda et al. |
| 2014/0286536 A1 | 9/2014 | Pettersson et al. |
| 2015/0062166 A1 | 3/2015 | Pan et al. |
| 2015/0145963 A1 | 5/2015 | Oshima et al. |
| 2015/0193657 A1 | 7/2015 | Gurman |
| 2015/0193965 A1 | 7/2015 | Chen et al. |
| 2015/0206313 A1 | 7/2015 | Reif et al. |
| 2016/0078798 A1 | 3/2016 | Watanabe et al. |
| 2016/0241774 A1 | 8/2016 | Mochizuki |
| 2016/0304098 A1 | 10/2016 | Ito et al. |
| 2016/0373714 A1 | 12/2016 | Lee et al. |
| 2017/0127048 A1 | 5/2017 | Nobayashi et al. |
| 2017/0180713 A1 | 6/2017 | Trail |
| 2017/0195653 A1 * | 7/2017 | Trail ................ H04N 13/366 |
| 2017/0214845 A1 | 7/2017 | Ohara |
| 2017/0244960 A1 | 8/2017 | Ciurea et al. |
| 2018/0061070 A1 | 3/2018 | Higuchi et al. |
| 2018/0063390 A1 * | 3/2018 | Trail ................ G06T 7/50 |
| 2018/0165528 A1 | 6/2018 | Koishi et al. |
| 2018/0262744 A1 | 9/2018 | Tadi et al. |
| 2018/0357775 A1 | 12/2018 | Wang et al. |
| 2019/0026921 A1 | 1/2019 | Murayama et al. |
| 2019/0058859 A1 * | 2/2019 | Price ................ H04N 13/271 |
| 2019/0087674 A1 | 3/2019 | Gao et al. |
| 2019/0259163 A1 | 8/2019 | Mao et al. |
| 2019/0355138 A1 * | 11/2019 | Hall ................ G02B 27/0172 |
| 2020/0193636 A1 | 6/2020 | Yang |
| 2020/0226776 A1 | 7/2020 | Toma et al. |

OTHER PUBLICATIONS

International Search Report and Written Opinion for International Application No. PCT/US2019/033129, dated Oct. 21, 2019, 9 pages.
Non-Final Office Action dated Oct. 26, 2020 for U.S. Appl. No. 16/417,872, filed May 21, 2019, 9 pages.
Non-Final Office Action dated Aug. 31, 2020 for U.S. Appl. No. 16/418,510, filed May 21, 2019, 13 pages.
Non-Final Office Action dated Jan. 26, 2023 for U.S. Appl. No. 17/230,109, filed Apr. 14, 2021, 9 pages.
Office Action dated Jan. 31, 2023 for Japanese Application No. 2020-558925, filed Oct. 22, 2020, 10 pages.

* cited by examiner

500

| Local Area ID 510 | Local Area Configuration ID 520 | Set of Parameters 530 |
|---|---|---|
| S1 | S1C1 | {AP11} |
|  | S1C2 | {AP12} |
|  | ⋮ | ⋮ |
|  | S1Cp | {AP1p} |
| S2 | S2C1 | {AP21} |
|  | S2C2 | {AP22} |
|  | ⋮ | ⋮ |
|  | S2Cq | {AP2q} |
| ⋮ | ⋮ | ⋮ |
| Sn | SnC1 | {APn1} |
|  | SnC2 | {APn2} |
|  | ⋮ | ⋮ |
|  | SnCr | {APnr} |

FIG. 5

DYNAMIC ADJUSTMENT OF STRUCTURED LIGHT FOR DEPTH SENSING SYSTEMS BASED ON CONTRAST IN A LOCAL AREA

CROSS-REFERENCE TO RELATED APPLICATION

This application is a continuation of co-pending U.S. application Ser. No. 16/415,202, filed May 17, 2019, which claims the benefit of U.S. Provisional Application Ser. No. 62/674,430, filed on May 21, 2018, each of which is hereby incorporated by reference in its entirety.

BACKGROUND

The present disclosure relates generally to depth camera assemblies, and specifically relates to dynamic structured light for depth camera assemblies.

Very generally, structured light sensing is the process of projecting a known structured light pattern (e.g., bars) onto a scene using a structured light projector. Depth information of the scene may be calculated using images of the scene illuminated with the structured light pattern. Effectiveness of the structured light pattern is based in part on a density of the pattern features. Conventional structured light projectors typically have a fixed pattern that is not dynamically adjusted. Accordingly, conventional structured light projectors typically are optimized for a particular range of distances or contrasts—but outside of those parameters the pattern either becomes too dense (e.g., such that power consumption is unnecessarily high and/or features are not resolvable from each other) or too sparse (e.g., leads to very low resolution).

SUMMARY

A depth camera assembly (DCA) determines depth information. Embodiments of the present disclosure support a method, computer readable medium, and apparatus for providing structured light for determining depth information. In some embodiments, the dynamic structured light pattern is determined based on a virtual model of physical locations stored at a mapping server connected with the headset via a network. The virtual model describes a plurality of spaces and properties of those spaces, wherein the location in the virtual model corresponds to a physical location of the headset. The mapping server determines a location in the virtual model for the headset, based on information describing at least a portion of the local area received from the headset. The mapping server determines a set of parameters associated with the physical location of the headset, based in part on the determined location in the virtual model and any parameters associated with the determined location. The headset generates a dynamic structured light pattern using the set of parameters received from the mapping server.

The DCA may determine regions of interest in which it may be beneficial to increase or decrease an amount of texture added to the region of interest using the dynamic structured light pattern. For example, the DCA may identify the regions of interest based on contrast values calculated using a contrast algorithm, or based on the parameters received from the mapping server. The DCA may selectively increase or decrease an amount of texture added by the dynamic structured light pattern in portions of the local area. By selectively controlling portions of the dynamic structured light pattern, the DCA may decrease power consumption and/or increase the accuracy of depth sensing measurements.

In some embodiments, a DCA includes a structured light (SL) projector, a camera assembly, and a controller. The SL projector is configured to project one or more SL patterns into a local area in accordance with illumination instructions. The camera assembly is configured to capture images of a portion of the local area including the one or more SL patterns. The controller is configured to determine an amount of contrast in the local area based in part on the captured images. The controller also identifies a first region of interest in the local area and a second region of interest in the local area. The first region of interest has a first amount of contrast and the second region of interest has a second amount of contrast that is greater than the first amount. The controller updates the illumination instructions based in part on the first amount of contrast within the first region of interest and the second amount of contrast within the second region of interest. The controller provides the updated illumination instructions to the SL projector. The updated illumination instructions cause the SL projector to project a first SL pattern into the first region of interest and a second SL pattern into the second region of interest. And the second SL pattern is different from the first SL pattern.

BRIEF DESCRIPTION OF THE DRAWINGS

FIG. 5 an example of a virtual model describing local areas and parameters describing configuration of the local areas, in accordance with one or more embodiments.

Figure 1A:
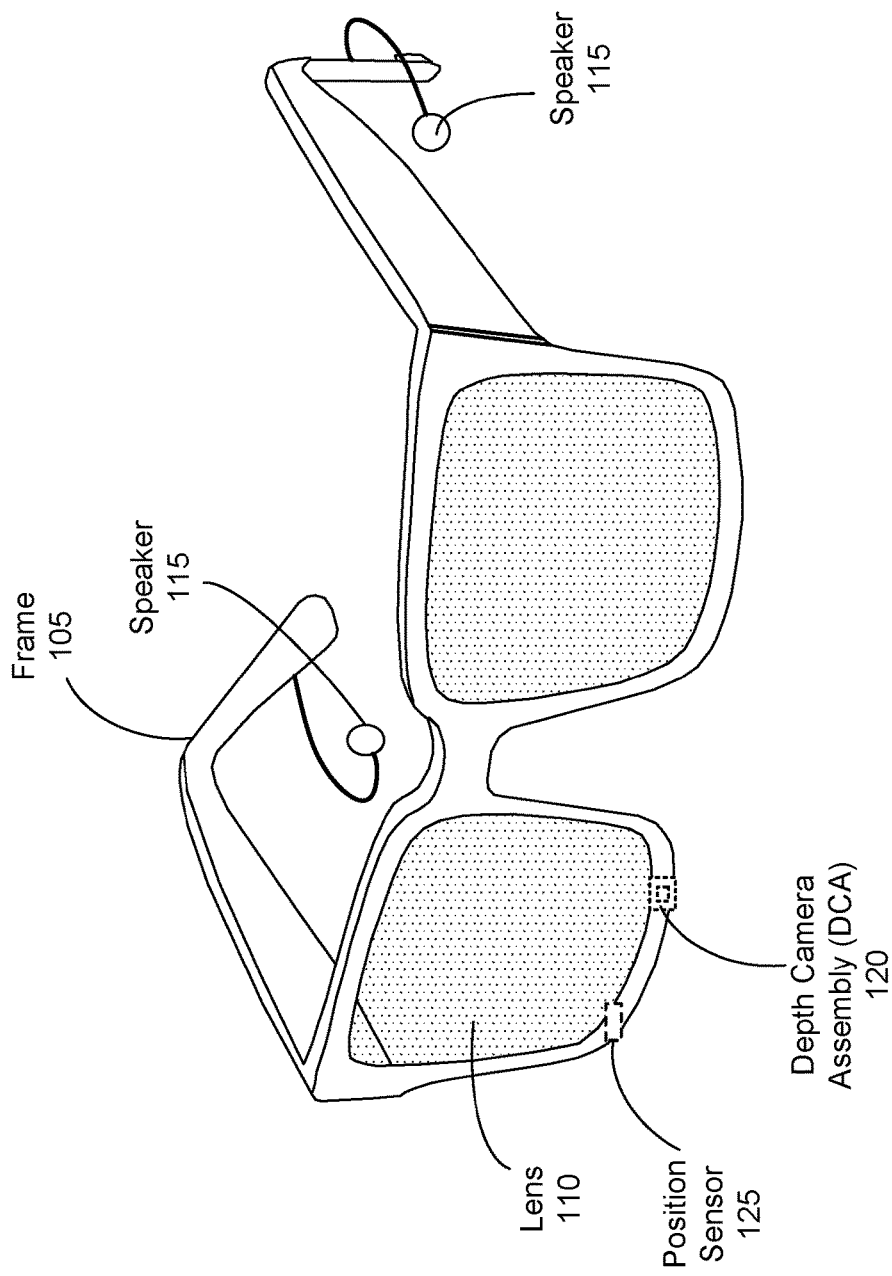
FIG. 1A is a perspective view of a headset including a depth camera assembly, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) determines depth information. The DCA projects a dynamic structured light pattern into a local area and captures images including a portion of the dynamic structured light pattern. Distortions in the dynamic structured light pattern by three-dimensional objects in the local area allow the DCA to calculate three-dimensional depth information. The DCA can impart some amount of texture to objects within the local area using the dynamic structured light pattern. The DCA may determine regions of interest in which it may be beneficial to change the texture added to the region of interest using the dynamic structured light pattern. The amount of texture added using the dynamic structured light pattern can affect accuracy of depth measurements (e.g., more texture can increase accuracy). Texture is affected by properties of the dynamic structured light pattern, such as the intensity, density, pattern shape (e.g., dots, bars, grids), polarization, blink rate, etc. Changing one property of the dynamic structured light pattern may change the texture added to a local area by the dynamic structured light pattern. For example, the DCA may identify the regions of interest based on contrast values calculated using a contrast algorithm, or based on the parameters received from a mapping server including a virtual model of the local area. The DCA may selectively increase or decrease an amount of texture added by the dynamic structured light pattern in portions of the local area.

The DCA may independently vary the dynamic structured light pattern in different portions of the local area. For example, in response to a change in condition at a given instant in time, the DCA may increase the intensity of the dynamic structured light pattern in a first region of interest, and the DCA may simultaneously decrease the intensity of the dynamic structured light pattern in a second region of interest. For each portion of the local area, the DCA may adjust any suitable property of the dynamic structured light pattern, such as the intensity, density, pattern shape (e.g., dots, bars, grids), polarization, blink rate, etc. In some embodiments, the dynamic structured light pattern may be time multiplexed, such that different patterns are projected over different regions at different times.

Conventional systems may project a static structured light pattern in order to determine depth information. However, the static structured light pattern may provide more texture than necessary in certain regions of the local area, which consumes excess power. Additionally, static structured light patterns may not provide sufficient texture to obtain accurate depth information in certain regions of the local area, such as in low contrast regions. In contrast, by obtaining information about a local area from a mapping server and by selectively controlling portions of the dynamic structured light pattern, the DCA may decrease power consumption and/or increase the accuracy of depth sensing measurements.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

The headset may be, e.g., a NED, HMD, or some other type of headset. The headset may be part of an artificial reality system. The headset further includes a display and an optical assembly. The display of the headset is configured to emit image light. The optical assembly of the headset is configured to direct the image light to an eye box of the headset corresponding to a location of a wearer's eye. In some embodiments, the image light may include depth information for a local area surrounding the headset.

FIG. 1A is a perspective view of a headset including a DCA 120, in accordance with one or more embodiments. In some embodiments (as shown in FIG. 1A), the headset 100 is implemented as a near eye display (NED). In alternate embodiments (not shown in FIG. 1A), the headset 100 is implemented as a head mounted display (HMD). In general, the headset 100 may be worn on the face of a user such that content (e.g., media content) is presented using one or both lenses 110 of the headset 100. However, the headset 100 may also be used such that media content is presented to a user in a different manner. Examples of media content presented by the headset 100 include one or more images, video, audio, or some combination thereof. The headset 100 may include, among other components, a frame 105, a lens 110, one or more speakers 115, a depth camera assembly (DCA) 120, and a position sensor 125.

The DCA 120 may be part of simultaneous localization and mapping (SLAM) sensors mounted the headset 100 for capturing visual information of a local area surrounding some or all of the headset 100. While FIG. 1A illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night. The headset 100 may be a near-eye display that produces artificial reality content for the user.

The frame 105 holds the other components of the headset 100. The frame 105 includes a front part that holds the lens 110 and end pieces to attach to a head of the user. The front part of the frame 105 bridges the top of a nose of the user. The end pieces (e.g., temples) are portions of the frame 105 to which the temples of a user are attached. The length of the end piece may be adjustable (e.g., adjustable temple length) to fit different users. The end piece may also include a portion that curls behind the ear of the user (e.g., temple tip, ear piece).

The lens 110 provides (e.g., generates and/or transmits) light to a user wearing the headset 100. The lens 110 may be prescription lens (e.g., single vision, bifocal and trifocal, or progressive) to help correct for defects in a user's eyesight. The prescription lens transmits ambient light to the user wearing the headset 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display.

The speakers 115 produce sound for user's ears. Although the speakers 115 are shown exterior to the frame 105, the speakers 115 may be enclosed in the frame 105. In some embodiments, instead of individual speakers for each ear, the headset 100 includes a speaker array (not shown in FIG. 1A) integrated into, e.g., end pieces of the frame 105 to improve directionality of presented audio content.

The DCA 120 determines depth information for a local area surrounding the headset 100, such as a room. The DCA 120 includes a light projector (e.g., a structured light projector and/or flash illumination for time-of-flight), imaging devices, and a controller (not shown in FIG. 1A). The structured light projector may generate a dynamic structured light pattern in a local area which may be adjusted according to various conditions, as further described herein.

The DCA 120 may capture data, such as images captured by the imaging devices of light projected onto the local area by the light projector. In one embodiment, the DCA 120 may include a controller and two or more imaging devices that are oriented to capture portions of the local area in stereo. The captured data may be images captured by the two or more imaging devices of the local area in stereo. The controller of the DCA 120 computes the depth information of the local area using the captured data and depth determination techniques (e.g., structured light, time-of-flight, stereo imaging, etc.). Based on the depth information, the controller of the DCA 120 determines absolute positional information of the headset 100 within the local area. The controller of the DCA 120 may also generate a model of the local area. The DCA 120 may be integrated with the headset 100 or may be positioned within the local area external to the headset 100.

In some embodiments, some of the cameras of the DCA 120 may also be configured to function as a passive camera assembly (PCA) including one or more passive imaging devices that generate color (e.g., RGB) image data. The passive imaging devices capture light from the environment of a local area to generate color image data. Rather than pixel values defining depth or distance from the imaging device, pixel values of the color image data may define visible colors of objects captured in the image data. In some embodiments, the passive imaging devices are controlled by a controller that generates the color image data based on light captured by the passive imaging device.

The DCA 120 may correct for ambient IR signal in an image frame comprising an IR structured light pattern. The ambient IR signal may be any IR signal in the image frame that is not provided by the IR structured light pattern. The DCA 120 may project a dynamic structured light pattern during capture of a first image, and the DCA may deactivate the dynamic structured light pattern during capture of a second image. The DCA 120 may subtract the pixel values of the second image from the pixel values of the first image, which may remove ambient IR signal from the image, and increase the ability of the DCA 120 to calculate depth information.

The position sensor 125 generates one or more measurement signals in response to motion of the headset 100. The position sensor 125 may be located on a portion of the frame 105 of the headset 100. The position sensor 125 may include a position sensor, an inertial measurement unit (IMU), or both. Some embodiments of the headset 100 may or may not include the position sensor 125 or may include more than one position sensors 125. In embodiments in which the position sensor 125 includes an IMU, the IMU generates IMU data based on measurement signals from the position sensor 125. Examples of position sensor 125 include: one or more accelerometers, one or more gyroscopes, one or more magnetometers, another suitable type of sensor that detects motion, a type of sensor used for error correction of the IMU, or some combination thereof. The position sensor 125 may be located external to the IMU, internal to the IMU, or some combination thereof.

Based on the one or more measurement signals, the position sensor 125 estimates a current position of the headset 100 relative to an initial position of the headset 100. The estimated position may include a location of the headset 100 and/or an orientation of the headset 100 or the user's head wearing the headset 100, or some combination thereof. The orientation may correspond to a position of each ear relative to a reference point. In some embodiments, the position sensor 125 uses the depth information and/or the absolute positional information from the DCA 120 to estimate the current position of the headset 100. The position sensor 125 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. The reference point is a point that may be used to describe the position of the headset 100. While the reference point may generally be defined as a point in space, however, in practice the reference point is defined as a point within the headset 100.

Figure 1B:
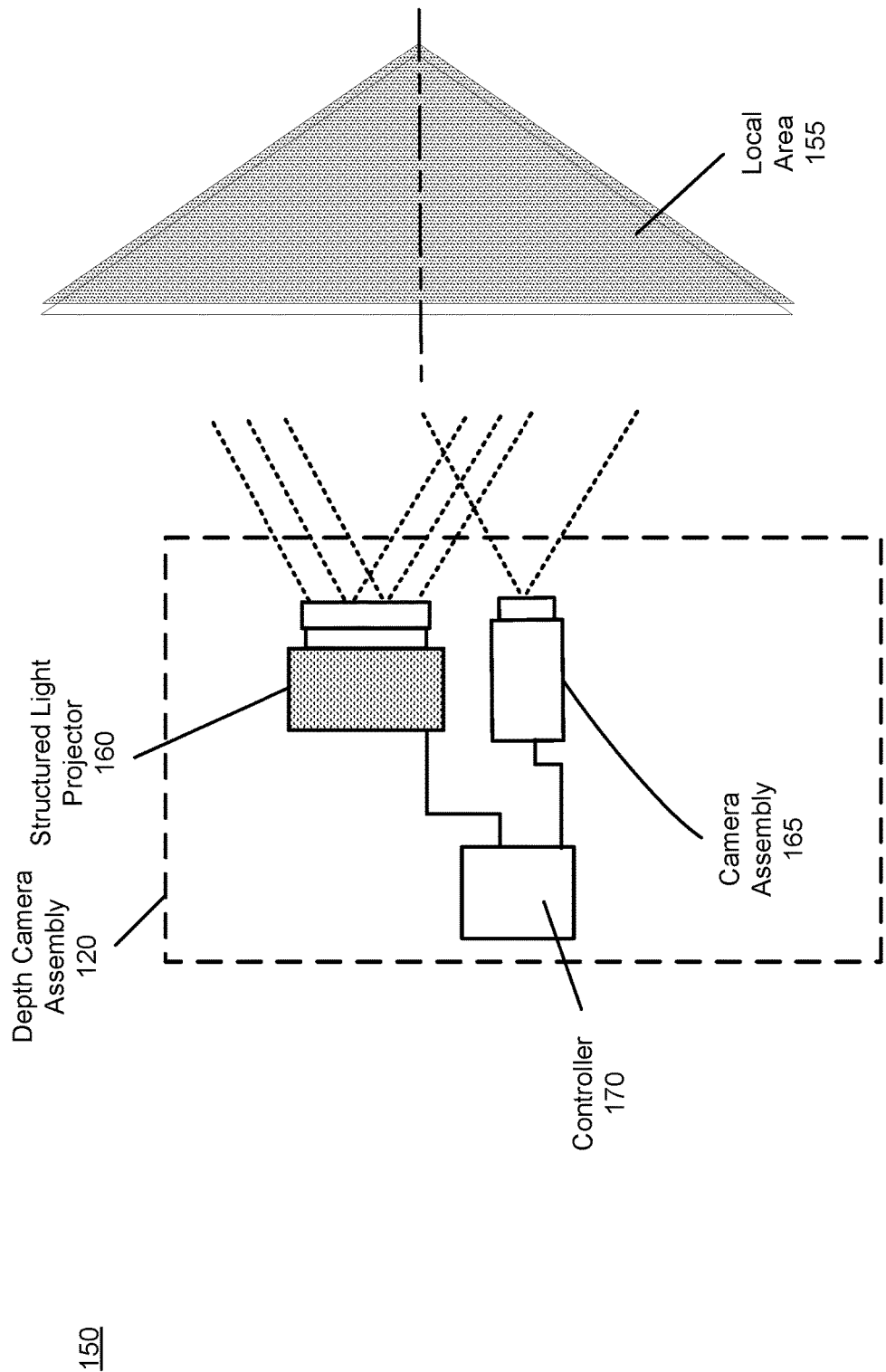
FIG. 1B is a schematic view of the DCA of the headset in FIG. 1A, in accordance with one or more embodiments.

FIG. 1B is a schematic view 150 of the DCA 120 of the headset 100 in FIG. 1A projecting light into a local area 155, in accordance with an embodiment. Some embodiments of the DCA 120 have different components than those described here. Similarly, in some cases, functions can be distributed among the components in a different manner than is described here.

The DCA 120 includes a structured light projector 160, a camera assembly 165, and a controller 170. The structured light projector 160 illuminates the local area 155 with structured light. In some embodiments, the structured light projector 160 includes a light source, a diffractive optical unit, and a projection assembly. The light source emits light. The diffractive optical unit includes a plurality of diffractive optical elements (DOEs). A DOE may be, e.g., one or more diffraction gratings, a diffuser, a spatial light modulator, some other element that forms structured light, or some combination thereof. Each DOE of the diffractive optical unit converts light from the light source into a structured light pattern. The structured light pattern may be, e.g., a dot matrix pattern, a line pattern, a sinusoid pattern, a multi (spatial) tone pattern, and a grid pattern, diffuse light (e.g., for time of flight or active stereo depth determination), some other light that can be used to determine depth information, or some combination thereof. The dynamic light pattern projection is achieved by the dynamic control of the light source, the DOE or projection assembly, or a combination thereof. In embodiments where the structured light pattern is diffuse light, the DOEs can be used to generate different field of views for the DCA 120. The DCA 120 selects the DOEs to adjust its field of view. The projection assembly projects the structured light pattern into the local area 155. For example, the projection assembly includes one or more optical elements (e.g., lens, polarizer, grating, etc.) that collect the structured light and project the structured light pattern into some or all of the local area 155.

The camera assembly 165 captures images of a portion the local area 155 and outputs the captured image to the controller 170. The camera assembly 165 includes one or more cameras.

In some embodiments, the controller 170 is configured to determine depth information of objects in the local area 155 using the captured image from the camera assembly 165. The controller 170 also controls how structured light is projected by the structured light projector 160 and how the camera assembly 165 captures image light. For example, the controller 170 instructs the structured light projector 160 to select one or more DOEs and/or control the light source and instructs the camera assembly 165 to capture images. In some embodiments, the controller 170 provides the determined depth information to a console (not shown in FIG. 1B) and/or an appropriate module of the headset 100 (e.g., a varifocal module, not shown in FIG. 1B). The console and/or the headset 100 may utilize the depth information to, e.g., generate content for presentation. Additional details regarding the DCA 120 and its components are discussed in detail below with regard to FIG. 3.

Figure 2:
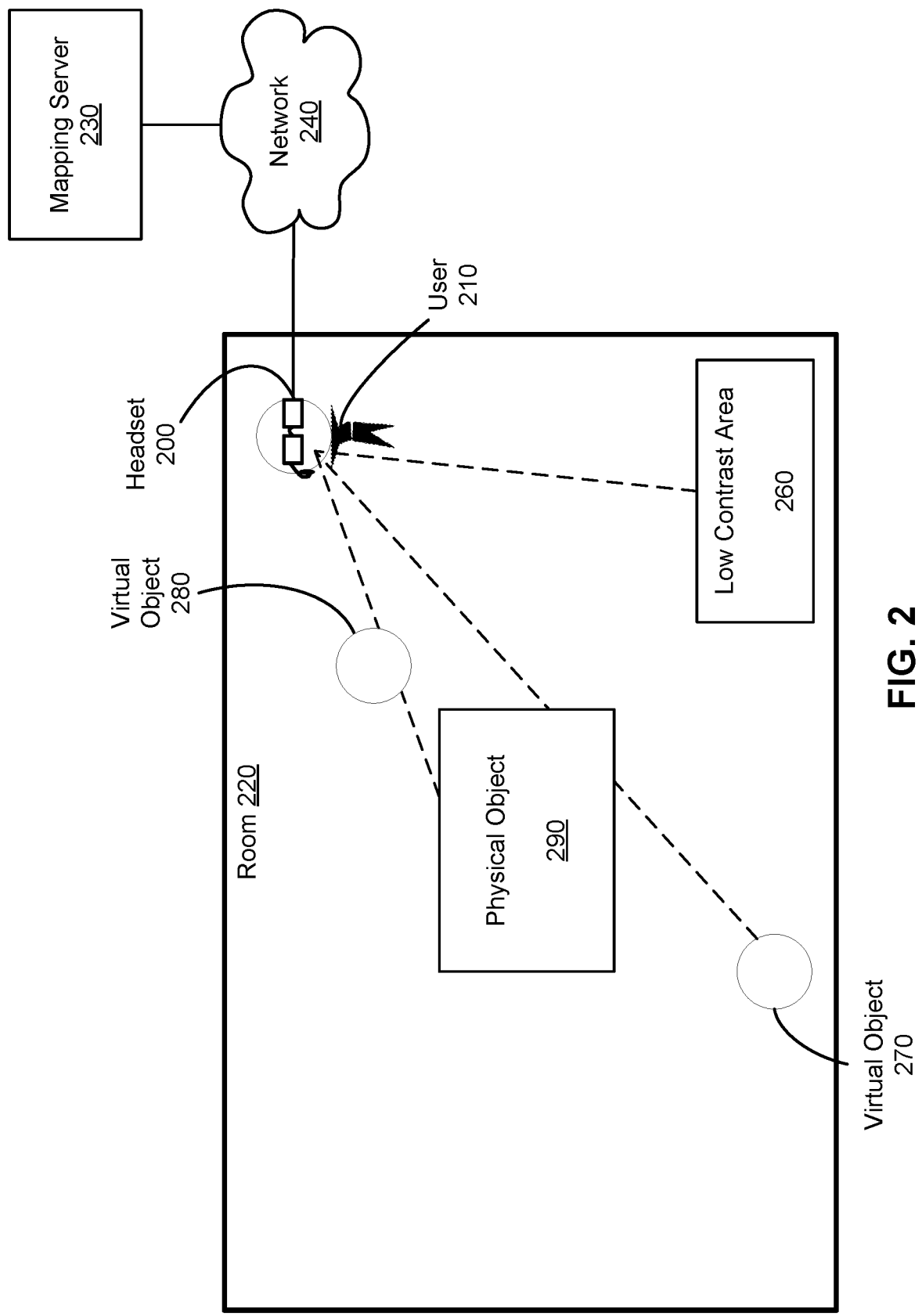
FIG. 2 illustrates a schematic diagram of a user wearing a headset in a room, in accordance with one or more embodiments.

FIG. 2 illustrates a schematic diagram of a user 210 wearing a headset 200 in a room 220, in accordance with one or more embodiments. The headset 200 includes a DCA (e.g., the DCA 120). The headset 200 may be an embodiment of the headset 100. The headset 200 may determine depth information describing some or all of the room 220 and/or the objects within the room 220. A structured light projector of the DCA may project a dynamic structured light pattern into the room 220. A camera assembly of the DCA may obtain images including the dynamic structured light pattern, and distortions in the dynamic structured light pattern may provide information regarding the objects within the room 220.

The headset 200 may determine visual information describing at least a portion of the room 220, and provide the visual information to the mapping server 230. For example, the headset 200 may include at least one DCA that generates depth information for at least the portion of the room 220. The DCA on the headset 200 may further include at least one passive camera assembly (PCA) that generates color image data for at least the portion of the room 220. In some embodiments, the DCA and the PCA of the headset 200 are part of simultaneous localization and mapping (SLAM) sensors mounted on the headset 200 for determining visual information of the room 220. Thus, the depth information captured by the at least one DCA and/or the color image data captured by the at least one PCA can be referred to as visual information determined by the SLAM sensors of the headset 200.

The headset 200 may communicate the visual information via a network 240 to the mapping server 230 for determining a set of parameters for the room 220. The network 240 may include any combination of local area and/or wide area networks using both wireless and/or wired communication systems. For example, the network 240 may include the Internet, as well as mobile telephone networks. In one embodiment, the network 240 uses standard communications technologies and/or protocols. Hence, the network 240 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 240 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 240 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 240 may also connect multiple headsets located in the same or different rooms to the same mapping server 230.

In some embodiments, the headset 200 provides its location information (e.g., Global Positioning System (GPS) location of the room 220) to the mapping server 230 in addition to the visual information for determining the set of parameters. In some embodiments, the headset 200 provides the location information to the mapping server 230 for determining the set of parameters. A set of parameters can be used to represent various properties of a particular configuration in the room 220 that together define a depth map in the room 220. The parameters may include room size, number of objects in the room, object locations, reflectivity of surfaces, contrast values, brightness, lighting conditions, whether and what type of texture (e.g., density of SL pattern, type of SL pattern, brightness of SL pattern, etc.,) should be added to locations within the room, etc., for various locations in the virtual model.

A configuration in the room 220 and an associated condition may change based on at least one of e.g., a change in location of the headset 200 in the room 220, a change in location of a physical or virtual object in the room 220, an increase or decrease in the number of objects in the room 220, a change in lighting in the room, etc. The headset 200 may dynamically vary all or a portion of the dynamic structured light pattern based on information available to the headset 200. The dynamic structured light pattern may be formed from a plurality of segments or tiles that are each projected into a portion of the room 220, together forming the entire dynamic structured light pattern. In some embodiments, each segment of the dynamic structured light pattern may contain a different structured light pattern and may be individually adjusted. For example, in response to a change in condition in the room 220 at a given instant in time, the headset 200 may increase the intensity of the dynamic structured light pattern in a first segment, and the headset 200 may simultaneously decrease the intensity of the dynamic structured light pattern in a second segment. For each portion of the room 220, the headset 200 may adjust any suitable property of the dynamic structured light pattern, such as the intensity, density, pattern shape (e.g., dots, bars, grids), polarization, blink rate, etc. In some embodiments, the dynamic structured light pattern may be time multiplexed, such that different patterns are projected into different portions of the room 220 at different times.

The headset 200 may adjust the dynamic structured light pattern in a low contrast area 260. For example, the headset may change an intensity, density, and/or shape (e.g., changing from bars to dots) of the dynamic structured light pattern in the direction of the low contrast area 260 in order to add texture to the low contrast area 260. In some embodiments, the depth camera assembly may detect the low contrast area 260, and the depth camera assembly may adjust the dynamic structured light pattern in the direction of the low contrast area 260 in order to improve the quality of depth estimation in that region.

The mapping server 230 includes a database that stores a virtual model describing a plurality of spaces, wherein one location in the virtual model corresponds to a current configuration of the room 220. The mapping server 230 receives, from the headset 200 via the network 240, visual information describing at least the portion of the room 220 and/or location information for the room 220. The mapping server 230 determines, based on the received visual information and/or location information, a location in the virtual model that is associated with the current configuration of the room 220. The mapping server 230 determines (e.g., retrieves) a set of parameters associated with the current configuration of the room 220, based in part on the determined location in the virtual model and any parameters associated with the determined location.

The mapping server 230 may provide information about the set of parameters to the headset 200 (e.g., via the network 240) for the headset 200 to determine an appropriate light pattern for the structured light projector. For example, the mapping server 230 may transmit information regarding a location of the low contrast area 260 within the room 220 to the headset 200. Alternatively, the mapping server 230 may generate information describing a structured light pattern using the set of parameters and provide the information to the headset 200, which the headset may then use to generate the structured light pattern. In some embodiments, some of the components of the mapping server 230 may be integrated with another device (e.g., a console) connected to the headset 200 via a wired connection (not shown in FIG. 2).

The headset 200 may display virtual objects to the user 210, such as virtual object 270 or virtual object 280. As illustrated in FIG. 2, the virtual object 280 may be located in the line of sight between the headset 200 and a physical object 290. The headset 200 may obtain information describing the location of the physical object 290 via the mapping server 230 or the depth camera assembly.

It may be unnecessary for the headset 200 to obtain depth information for physical objects which are occluded by the virtual object 280. However, it may be desirable for the headset 200 to obtain depth information for any objects which may be located between the headset 200 and the virtual object 280. Thus, the headset 200 may decrease an amount of texture in a region of interest containing the occluded objects by decreasing the intensity or density of the structured light projected in the direction of the virtual object 280, such that the texture is sufficient for determining depth information between the headset 200 and the virtual object 280.

Similarly, it may be unnecessary for the headset 200 to obtain depth information in the area of the virtual object 270 which is occluded by the physical object 290. Thus, instead of providing sufficient texture to the distance of the virtual object 270, the headset 200 may decrease the intensity or density of the structured light projected in the direction of the virtual object 270.

Figure 3:
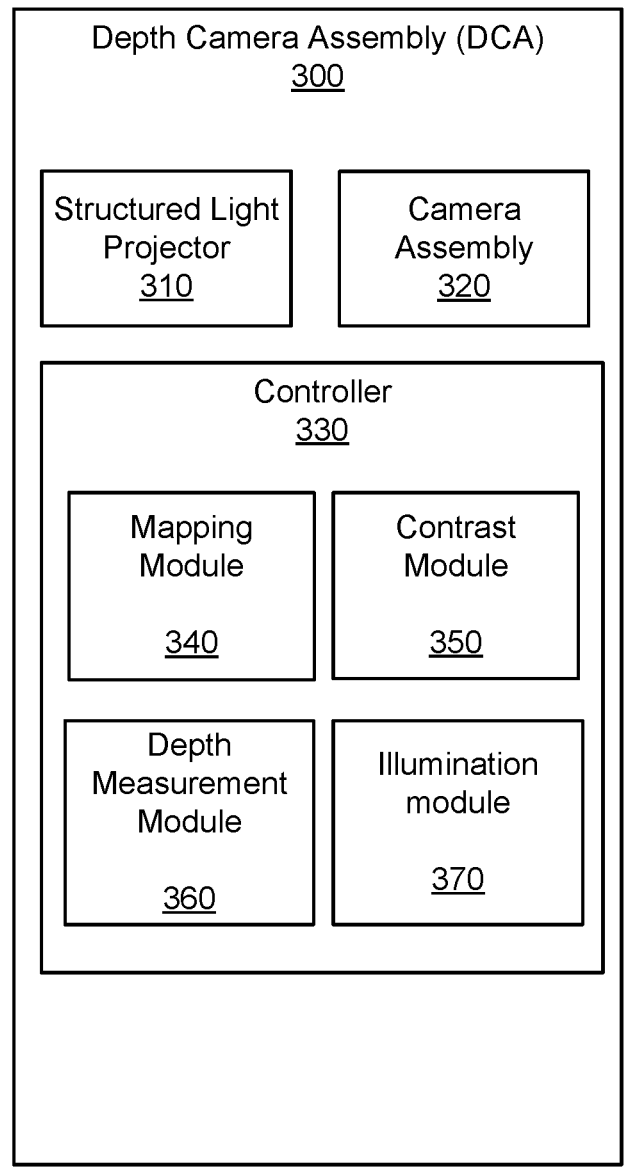
FIG. 3 is a block diagram of a DCA, in accordance with one or more embodiments.

FIG. 3 is a block diagram of a DCA 300 for a headset, in accordance with one or more embodiments. In some embodiments, the DCA 300 may be the DCA 120 described with respect to FIG. 1A and FIG. 1B. Some embodiments of the DCA 300 have different components than those described here. Similarly, the functions can be distributed among the components in a different manner than is described here. In some embodiments, some of the functions of the DCA 300 may be part of different components (e.g., some may be part of the headset and some maybe part of a console and/or server).

The DCA 300 generates depth information of a local area, such as a room. Depth information includes pixel values defining distance from the DCA 300, providing a mapping of locations captured in the depth information, such as a three-dimensional mapping of locations captured in the depth information. The DCA 300 includes a structured light projector 310, a camera assembly 320, and a controller 330.

The structured light projector 310 generates structured light and projects the structured light into the local area. The structured light projector 310 comprises one or more illumination sources, one or more pattern plates, and one or more projection assemblies. An illumination source is configured to emit light (e.g., as an optical beam), and may emit multiple wavelengths of light. The illumination source may emit light in, e.g., a visible band (~380 nm to 750 nm), in an infrared (IR) band (~750 nm to 1,800 nm), in an ultraviolet band (~100 nm to 380 nm), some other portion of the electromagnetic spectrum that the camera assembly 320 is configured to detect, or some combination thereof. An illumination source may be, e.g., a laser diode (e.g., edge emitters), an inorganic or organic LED, a vertical-cavity surface-emitting laser (VCSEL), or some other source. In some embodiments, a single emitter or a plurality of emitters in the structured light generator can emit light having a structured light pattern. In some embodiments, the plurality of emitters is addressable individually or by block/section/group. Light emitted from the one or more of the illumination sources may be, e.g., polarized (e.g., linear, circular, etc.).

The one or more pattern plates generates a SL pattern using light from the one or more illumination sources. A pattern plate may be, e.g., one or more diffractive optical elements, a mask, a computer-generated hologram, an acousto-optic device (e.g., configured to function as a dynamic diffraction grating), some other element that generates a structured light pattern, or some combination thereof.

The projection assembly projects structured light into the local area. The projection assembly comprises one or more optical elements that direct the structured light pattern into the local area. For example, the projection assembly could comprise a plurality of lenses. In some embodiments, the projection assembly includes a beam shaping element that changes a profile, or general intensity envelope, of the structured light diffracted by the one or more pattern plates. The SL pattern includes a plurality of SL elements. Each element is a discrete portion of the SL pattern, such as a line or a dot. For example, each of the SL elements projected by the illuminated pattern plate is a dot associated with a particular location on the pattern plate. For example, the structured light projector 310 may project a plurality of SL elements of different types (e.g. lines, grids, or dots) onto a portion of a local area surrounding the headset.

The structured light projector 310 may dynamically vary the dynamic structured light pattern in accordance with instructions from the controller 330. In some embodiments, the structured light projector 310 may project the same pattern over the entire field of view of the structured light projector 310, or the structured light projector 310 may project different structured light patterns to different portions of the field of view. For example, the dynamic structured light pattern may be formed from a plurality of segments or tiles that are each projected into a portion of the field of view of the structured light projector 310, together forming the entire dynamic structured light pattern. In some embodiments, each segment of the dynamic structured light pattern may contain a different structured light pattern and may be individually adjusted. For example, in response to a change in condition at a given instant in time, the structured light projector 310 may increase the intensity of the dynamic structured light pattern in a first segment, and the structured light projector 310 may simultaneously decrease the intensity of the dynamic structured light pattern in a second segment. For each portion of the field of view of the structured light projector 310, the structured light projector 310 may adjust any suitable property of the dynamic structured light pattern, such as the intensity, density, pattern shape (e.g., dots, bars, grids), polarization, blink rate, etc. In some embodiments, the dynamic structured light pattern may be time multiplexed, such that different patterns are projected into different portions of the field of view at different times.

The structured light projector 310 may vary the dynamic structured light pattern by having different emitters be active, having some or all of the emitters be tunable, or by having different pattern plates for different structured light patterns. In some embodiments, the dynamic structured light pattern is achieved by only controlling each emitter individually or by subset or section, in which the dynamic properties are manifested in the projected pattern in terms of pattern shape, intensity, polarization, temporal modulation, field of view, etc. In some embodiments, tunable optical components, such as a lens, grating, or spatial light modulator are used to realized dynamic patterns. In some embodiments, the combination of using an addressable light source and tunable optics may be adopted to realize dynamic light patterns with considerations in projector size, weight, power, cost, etc.

The camera assembly 320 is configured to capture images of the local area. The camera assembly 320 includes one or more imaging devices (e.g., a camera) that can capture images in at least an optical band of the SL pattern. In some embodiments, the one or more imaging devices and/or other imaging devices of the camera assembly 320 may also capture light in a visible optical band. In some instances, the some or all of the captured images of the local area may include some or all of the SL pattern (e.g., reflected by objects in the local area).

The controller 330 controls the components of the DCA 300. The controller may comprise a mapping module 340, a contrast module 350, a depth measurement module 360, and an illumination module 370. Some embodiments of the controller 330 have different components than those described here. Similarly, the functions can be distributed among the components in a different manner than is described here. In some embodiments, some of the functions of the controller 330 may be part of different components (e.g., some may be part of the headset and some maybe part of a console and/or server).

The mapping module 340 may be configured to communicate with a mapping server (e.g., the mapping server 230). The mapping module 340 may transmit information to the mapping server including a location of the DCA 300 and/or images captured by the DCA 300. The mapping module may further provide the depth information to the mapping server 230 of FIG. 2, or some other component.

The contrast module 350 may calculate a contrast in the local area based on images captured by the camera assembly 320. The contrast module 350 may use a variety of contrast algorithms, such as Weber contrast, Michelson contrast, Root mean square (RMS) contrast, etc. In some embodiments, the contrast module 350 may calculate the contrast using an L2 Contrast with Sliding Max algorithm, as further described with reference to FIG. 7. The contrast module 350 may calculate the contrast for each pixel of a sensor, corresponding to a specific area in the local area.

The illumination module 370 may generate illumination instructions to provide to the light projector 310 to project a dynamic structured light pattern. The illumination instructions may reduce (and in some cases minimize) power consumption of the light projector 310 while providing sufficient texture in the local area to calculate depth information. In some embodiments, the illumination module 370 may determine that the local area contains sufficient texture based on a confidence level of depth measurements (e.g., texture may be sufficient if depth measurements are calculated with a confidence level of greater than 95%, or greater than 50%). For example, the contrast module 350 may detect a first region of interest of the local area that has a relatively high contrast value, and the illumination module 370 may decrease the amount of texture provided to the first region of interest by the light projector 310, as the depth measurement module 360 may be able to sufficiently calculate the depth information in the first region of interest without additional texture provided by the light projector 310. Similarly, the contrast module 350 may detect a second region of interest of the local area that has a relatively low contrast value, and the illumination module 370 may increase the amount of texture provided to the second region of interest by the light projector 310, as the depth measurement module 360 may be able to better calculate the depth information in the second region of interest with additional texture.

In some embodiments, the illumination module 370 may instruct the light projector to be active (e.g., emitting light) or inactive (e.g., not emitting light) in conjunction with images captured by the camera assembly 320 as part of a frame subtraction. For example, the DCA 300 may correct for ambient IR signal in an image frame comprising an IR structured light pattern. The ambient IR signal may be any IR signal in the image frame that is not provided by the IR structured light pattern. The illumination module 370 may instruct the light projector 310 to activate during capture of a first image by the camera assembly 320, and to inactivate during capture of a second image by the camera assembly 320.

The depth measurement module 360 determines depth information for each pixel of an image based on images captured by the camera assembly 320 and stores the depth information for each pixel in association with the pixel to generate the depth image. The depth measurement module analyzes the images containing the dynamic structured light pattern. Distortions in the dynamic structured light pattern by three-dimensional objects in the local area allow the DCA to calculate three-dimensional depth information.

In some embodiments, the depth measurement module 360 performs a frame subtraction using multiple image frames captured by the illumination module 370. The depth measurement module 360 may subtract the pixel values of a second image which was captured with the structured light pattern inactive, from the pixel values of a first image which was captured with the structured light pattern activated, which may remove ambient IR signal from the image, and increase the ability of the depth measurement module 360 to calculate depth information. In some embodiments, the intensity of the first image and the second image may be scaled based on differences in exposure times between the captures.

In various embodiments, the depth measurement module 360 determines depth information in images without the dynamic structured light pattern, such as by applying one or more stereo imaging, also referred to as "stereo," processes to a pair of images captured by the camera assembly 320 at a common time to determine depth information. Example stereo processes include global patch matching and semi-global matching. When the depth measurement module 360 applies a semi-global matching process, the depth measurement module 360 performs dense patch matching over a subset of an image captured by a first imaging device of the camera assembly 320 and a subset of an additional image captured by a second imaging device of the camera assembly 320 at a common time as the image; for example, the depth measurement module 360 rectifies the image and the additional image and performs dense patch matching along epipolar lines between the rectified image and additional image. When applying the semi-global matching process, the depth measurement module 360 also propagates depth information for a pixel to other pixels along a finite number of paths (e.g., 4, 8, 16) across an image. However, in other embodiments, the depth measurement module 360 implements any suitable stereo process, such as via a convolutional neural network. In some embodiments, the illumination module 370 may instruct the light projector 310 to project a structured light pattern into the scene to add texture to the scene, which may increase the accuracy of depth measurements even without a pre-calibrated structured light pattern.

Figure 4:
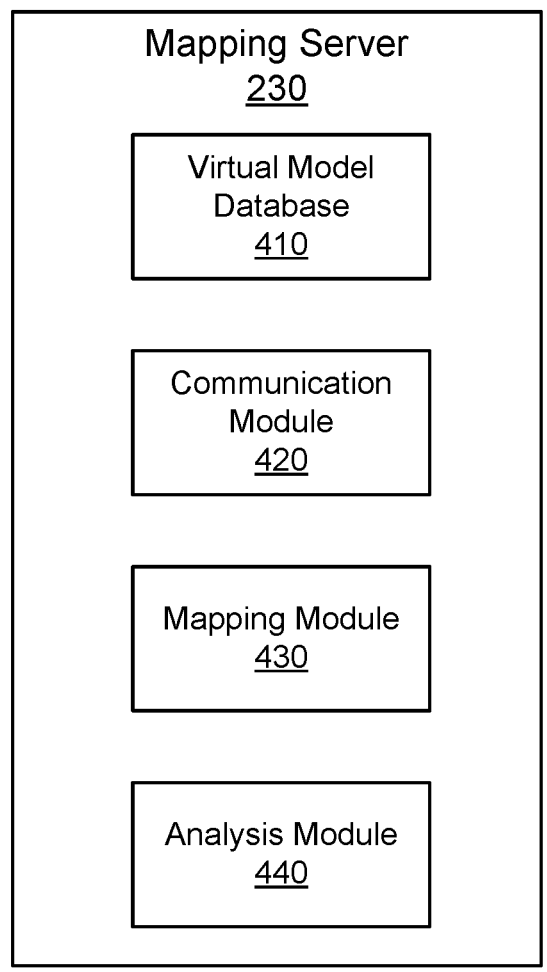
FIG. 4 is a block diagram of a mapping server, in accordance with one or more embodiments.

FIG. 4 is a block diagram of the mapping server 230, in accordance with one or more embodiments. The mapping server 230 determines a set of parameters for a physical space (room) where a headset, such as the headset 100 of FIG. 1A, is located. The parameters may include room size, number of objects in the room, object locations, reflectivity of surfaces, contrast values, brightness, lighting conditions, whether and what type of texture should be added to locations within the room, etc. The determined set of parameters may be used at the headset 100 to generate a structured light pattern for the local area. The mapping server 230 includes a virtual model database 410, a communication module 420, a mapping module 430, and an analysis module 440. In other embodiments, the mapping server 230 can have any combination of the modules listed with any additional modules. In some other embodiments, the mapping server 230 includes one or more modules that combine functions of the modules illustrated in FIG. 4. A processor of the mapping server 230 (not shown in FIG. 4) may run some or all of the virtual model database 410, the communication module 420, the mapping module 430, the analysis module 440, one or more other modules or modules combining functions of the modules shown in FIG. 4.

The virtual model database 410 stores a virtual model describing a plurality of physical spaces and properties of those physical spaces. Each location in the virtual model corresponds to a physical location of the headset within a local area having a specific configuration. The condition represents a condition of the local area having a set of properties represented with a set of parameters. A particular location in the virtual model may correspond to a current physical location of the headset within the room 220 of FIG. 2. Each location in the virtual model is associated with a set of parameters for a corresponding physical space that represents one configuration of the local area. The set of parameters describes various properties of that one particular configuration of the local area. The parameters may include room size, number of objects in the room, object locations, reflectivity of surfaces, contrast values, brightness, lighting conditions, whether and what type of texture should be added to locations within the room, etc., for various locations in the virtual model.

The communication module 420 is a module that communicates with the headset via a network (e.g., the network 240 of FIG. 2). The communication module 420 receives, from the headset, visual information describing at least the portion of the room 220. In one or more embodiments, the visual information includes image data for at least the portion of the room 220. For example, the communication module 420 receives depth information captured by the DCA of the headset with information about a shape of the room 220 defined by surfaces of the room 220, such as surfaces of the walls, floor and ceiling of the room 220. The communication module 420 may also receive color image data captured by the PCA of the headset. The mapping server 230 may use the color image data to associate different locations and contrast values with the surfaces of the room 220. The communication module 420 may provide the visual information received from the headset (e.g., the depth information and the color image data) to the mapping module 430.

The mapping module 430 maps the visual information received from the headset to a location of the virtual model. The mapping module 430 determines the location of the virtual model corresponding to a current physical space where the headset is located, i.e., a current configuration of the local area. The mapping module 430 searches through the virtual model to find mapping between (i) the visual information that include at least e.g., information about geometry of surfaces of the physical space and information about contrast values of the surfaces and (ii) a corresponding configuration of the physical space within the virtual model. The mapping is performed by matching the geometry and/or contrast information of the received visual information with geometry and/or contrast information that is stored as part of the configuration of the physical space within the virtual model. The corresponding configuration of the physical space within the virtual model corresponds to a model of the physical space where the headset is currently located. If no matching is found, this is an indication that a current configuration of the physical space is not yet modeled within the virtual model. In such case, the mapping module 430 may inform the analysis module 440 that no matching is found, and the analysis module 440 determines a set of parameters based at least in part on the received visual information.

The analysis module 440 determines the set of parameters associated with the physical location of the headset, based in part on the determined location in the virtual model obtained from the mapping module 430 and any parameters in the virtual model associated with the determined location. The parameters may include room size, number of objects in the room, object locations, reflectivity of surfaces, contrast values, brightness, lighting conditions, whether and what type of texture should be added to locations within the room, etc. In some embodiments, the analysis module 440 retrieves the set of parameters from the virtual model, as the set of parameters are stored at the determined location in the virtual model that is associated with a specific space configuration. In some other embodiments, the analysis module 440 determines the set of parameters by adjusting a previously determined set of parameters for a specific space configuration in the virtual model, based at least in part on the visual information received from the headset. For example, the analysis module 440 may run off-line simulations using the received visual information to determine the set of parameters.

In some embodiments, the analysis module 440 determines that previously generated parameters are not consistent with a condition of the current physical location of the headset. The detected miss-match may trigger regeneration of a new set of parameters at the mapping server 230. Once re-computed, this new set of parameters may be entered into the virtual model of the mapping server 230 as a replacement for the previous set of parameters, or as an additional state for the same physical space. The analysis module 440 provides the derived set of parameters to the communication module 420 that communicates the set of parameters from the mapping server 230 to the headset, which may be used by the headset to generate a structured light pattern.

In some embodiments, the one or more parameters determined by the analysis module 440 represent a new set of parameters that was not part of the virtual model as a current configuration of the room 220 and a corresponding condition of the room 220 were not modeled by the virtual model. In such case, the virtual model database 410 stores the new set of parameters at a location within the virtual model that is associated with a current configuration of the room 220 modeling a current condition of the room 220. Some or all of the one or more parameters may be stored in the virtual model along with a confidence (weight) and an absolute time stamp associated with that parameter, which can be used for re-computing some of the parameters.

FIG. 5 is an example of a virtual model 500 describing local areas and parameters describing configuration of the local areas. The parameters may include room size, number of objects in the room, object locations, reflectivity of surfaces, contrast values, brightness, lighting conditions, whether and what type of texture should be added to locations within the room, etc. The virtual model 500 may be stored in the virtual model database 410 of the mapping server 230. The virtual model 500 may represent geographic information storage area in the virtual model database 410 that stores geographically tied triplets of information (i.e., a local area identifier (ID) 510, a local area configuration ID 520, and a set of parameters 530) for various local areas surrounding one or more headsets.

The virtual model 500 includes a listing of possible local areas S1, S2, . . . , Sn, each identified by a local area ID 510. A local area ID 510 identifies a particular type of local area. For example, a local area ID 510 identifies different types or rooms, such as a conference room, a bathroom, a hallway, an office, a bedroom, a dining room, a living room, some other type of physical space, or some combination thereof. Thus, each local area ID 510 corresponds to one particular type of physical space.

Each local area ID 510 is associated with one or more local area configuration IDs 520. Each local area configuration ID 510 corresponds to a configuration of a local area identified by the local area ID 510 that has specific depth information or contrast information. The local area configuration ID 510 may include information identifying a number of objects in the local area, positioning of objects within the local area an identification, ambient lighting of the local area, or other conditions within the local area. Different configurations of the local area affect depth information to different regions of the local area or contrast information from different regions of the local area. Each local area configuration ID 520 may be represented as a code ID (e.g., a binary code, an alphanumeric code) that identifies a configuration of a local area ID 510. For example, as illustrated in FIG. 5, the local area S1 can be associated with p different space configurations S1C1, S1C2, . . . , S1Cp each representing a different configuration of local area S1; the local area S2 can be associated with q different configurations S2C1, S2C2, . . . , S2Cq each representing a different configuration of local area S2; the local area Sn can be associated with r different configurations SnC1, SnC2, . . . , SnCr each representing a different configuration of local area Sn. The mapping module 430 may search the virtual model 500 to find an appropriate local area configuration ID 520 based on visual information of a local area received from the headset.

Each local area configuration ID 520 is associated with a specific set of parameters 530 stored in a corresponding location of the virtual model 500. As illustrated in FIG. 5, p different space configurations S1C1, S1C2, . . . , S1Cp of the same local area S1 are associated with p different sets of parameters {P11}, {P12}, . . . , {P1p}. Similarly, as further illustrated in FIG. 5, q different space configurations S2C1, S2C2, . . . , S2Cq of the same local area S2 are associated with q different sets of parameters {P21}, {P22}, . . . , {P2q}; and r different space configurations SnC1, SnC2, . . . , SnCr of the same local area Sn are associated with r different sets of parameters {Pn1}, {Pn2}, . . . , {Pnr}. The analysis module 440 may retrieve a corresponding set of parameters 530 from the virtual model 500 when the mapping module 430 finds a local area configuration ID 520 corresponding to a current configuration of a local area where the headset is located. The parameters may be used by a DCA (e.g. the DCA 300) to generate a dynamic structured light pattern.

Figure 6:
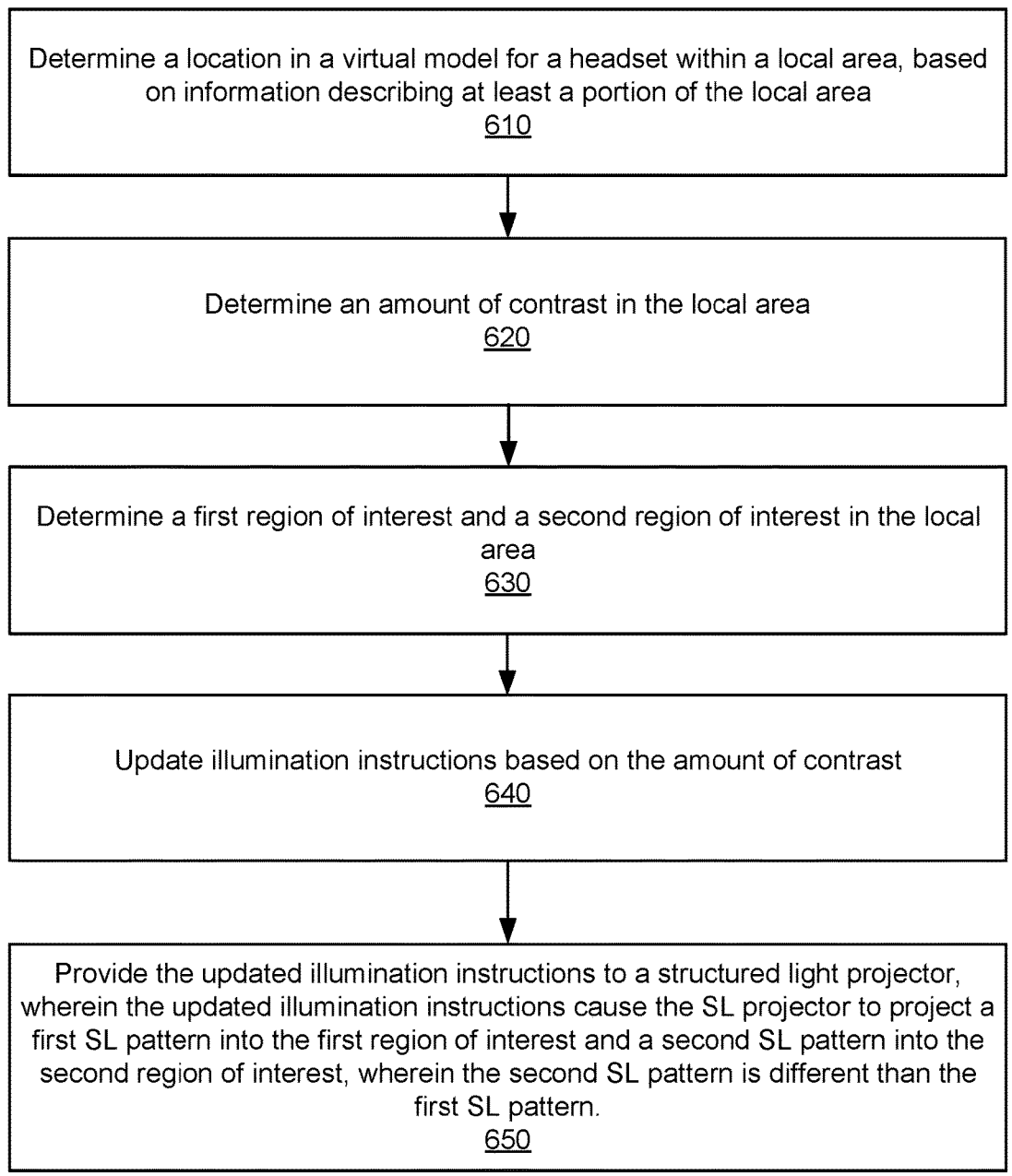
FIG. 6 is a flowchart illustrating a process for generating a dynamic structured light pattern, in accordance with one or more embodiments.

FIG. 6 is a flowchart illustrating a process 600 for generating a dynamic structured light pattern, in accordance with one or more embodiments. The process 600 of FIG. 6 may be performed by the components of a DCA (e.g., the DCA 300). Other entities (e.g., the mapping server 230 of FIG. 2 and/or components shown in FIG. 9) may perform some or all of the steps of the process in other embodiments. Likewise, embodiments may include different and/or additional steps, or perform the steps in different orders.

The DCA determines 610 a location in a virtual model for the headset (e.g., the headset 200) within a local area (e.g., the room 220), based on information describing at least a portion of the local area. The DCA may transmit information to a mapping server. For example, the DCA may transmit a GPS location, depth information which can be used to determine a location of the headset, or the DCA may transmit images captured by the headset. In some embodiments, the DCA may initially project a structured light pattern and capture images to determine depth information, and the DCA may transmit the depth information to the mapping server to generate parameters for a dynamic structured light pattern. The mapping server may identify the location of the headset in a stored virtual model. The stored virtual model describes a plurality of spaces and properties of those spaces, wherein the location in the virtual model corresponds to a physical location of the headset within the local area, as further described with respect to FIG. 5. The information describing at least the portion of the local area may include depth information with information about a shape of at least the portion of the local area defined by surfaces of the local area (e.g., surfaces of walls, floor and ceiling) and one or more objects (real and/or virtual) in the local area. The information describing at least the portion of the local area may further include contrast data for associating areas of relatively high or low contrast with the surfaces of the local area and with surfaces of the one or more objects. In some embodiments, the information describing at least the portion of the local area may include location information of the local area, e.g., an address of the local area, GPS location of the local area, information about latitude and longitude of the local area, etc. In some other embodiments, the information describing at least the portion of the local area includes: depth information, color image data, acoustic data, location information of the local area, some other information, or combination thereof. In some embodiments, the DCA may generate an initial structured light pattern based in part on the information describing the portion of the local area.

The DCA determines 620 an amount of contrast in the local area. The DCA may project structured light into the local area and capture images of a portion of the local area including the structured light pattern. Based in part on the captured images, the headset determines the amount of contrast. The DCA may determine a contrast value for each portion of the local area corresponding to a pixel value. In some embodiments, the DCA may determine an average contrast value for the entire local area that is in the field of view of the DCA. In some embodiments, the DCA uses a contrast algorithm to determine an amount of contrast in the local area, as further described with respect to FIG. 7. In some embodiments, the headset determines the amount of contrast in the local area based on parameters received from the mapping server.

The DCA determines 630 a first region of interest in the local area and a second region of interest in the local area. The first region of interest has a first amount of contrast and the second region of interest has a second amount of contrast. In some embodiments, the DCA may select regions of interest based on the contrast algorithm identifying regions having relatively low or high contrast values. In various embodiments, the headset receives information describing the local area from the mapping server and selects one or more regions of interest in the local area based on the information received from the mapping server. For example, the information from the mapping server identifies regions within the local area that previously included an object. The headset selects a region of interest in the image corresponding to a region identified by the information from the mapping server as previously including an object. As another example, information received from the mapping server identifies contrast measurements previously determined for different regions of the local area, and the DCA selects a region of interest as a region having at least a threshold contrast measurement from the information received from the mapping server. Hence, in various embodiments, the DCA selects regions of interest as regions of an image corresponding to information received from the mapping server having one or more specific characteristics.

The DCA updates 640 illumination instructions, based in part on the amount of contrast in the local area. The DCA may further update the illumination instructions based on the determined location in the virtual model and any parameters associated with the determined location. The updated illumination instructions may cause a change in the dynamic structured light pattern. Changing the dynamic structured light pattern may increase or decrease the texture added to the local area by the dynamic structured light pattern. Increasing the texture in the local area assists the DCA in determining distances between the DCA and an object. In some embodiments, the mapping server retrieves the set of parameters from the virtual model from the determined location in the virtual model associated with a space configuration where the headset is currently located. In some other embodiments, the mapping server determines the set of parameters by adjusting a previously determined set of parameters in the virtual model, based at least in part on the information describing at least the portion of the local area received from the DCA. The mapping server may analyze images received from the DCA to determine whether an existing set of parameters (if available) are consistent with the image analysis or should be re-computed. If the existing parameters are not consistent with the image analysis, the mapping server may use the information describing at least the portion of the local area (e.g., room geometry, lighting) to determine a new set of parameters.

The DCA may update the illumination instructions for the identified regions of interest. For example, the illumination instructions may increase the density or intensity of the dynamic structured light pattern in the first region of interest, and the illumination instructions may decrease the density or intensity of the structured light pattern in the second regions of interest. In some embodiments, the updated illumination instructions may instruct the light projector to activate or deactivate the structured light pattern in one or more regions of interest.

The DCA provides 650 the updated instructions to a structured light projector, wherein the updated illumination instructions cause the SL projector to project a first SL pattern into the first region of interest and a second SL pattern into the second region of interest, wherein the second SL pattern is different than the first SL pattern. Thus, the DCA dynamically adapts the structured light pattern used to obtain depth information in the local area. In some embodiments, the process 600 may continuously repeat, or may repeat in response to an event, such as movement of the headset or movement of an object within the local area. Thus, the DCA may conserve battery by decreasing the amount of structured light projected in areas where additional texture is not necessary. Similarly, the DCA may improve depth measurement accuracy by increasing the texture in regions of interest where the additional texture is beneficial.

Figure 7:
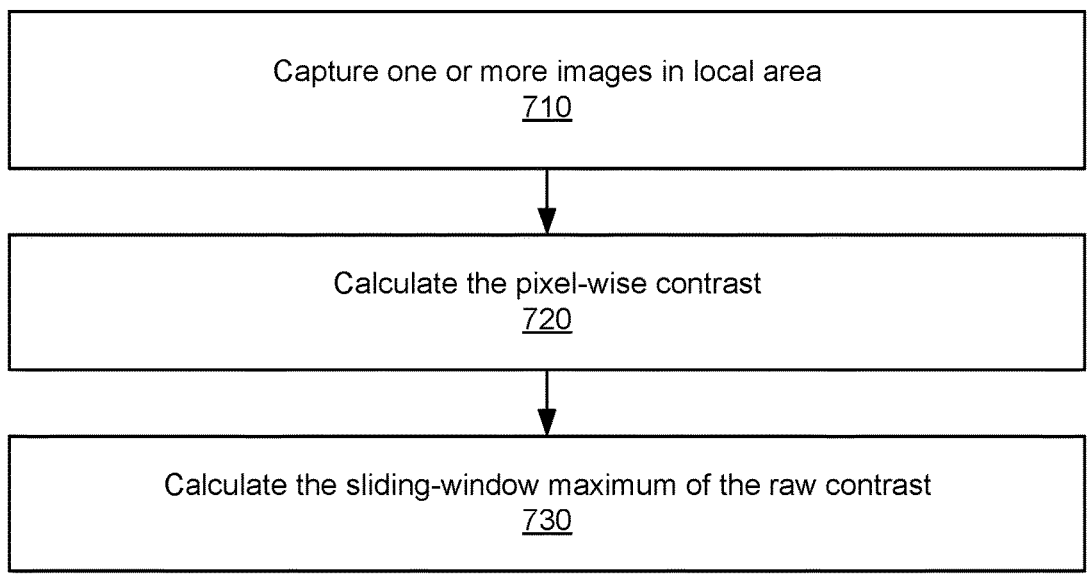
FIG. 7 is a flowchart illustrating a process for determining an amount of contrast in the local area, in accordance with one or more embodiments.

FIG. 7 is a flowchart illustrating a process 700 for determining an amount of contrast in the local area, in accordance with one or more embodiments. In some embodiments, the process 700 may be performed as all or a portion of step 620 described with respect to FIG. 6. The process 700 may be performed by the components of a DCA (e.g., the DCA 300).

The DCA captures 710 one or more images in the local area. The DCA calculates a contrast in all or a portion of the images. The contrast is the difference in luminance, color, distance, or other measurable quantity that makes an object (or its representation in an image or display) distinguishable. The contrast in the images correlates to local depth performance within a region of interest. For example, if the image contains a high contrast value in a region of interest, the DCA may place a high value of confidence on depth measurements in that region of interest. Thus, the DCA may decrease the amount of texture provided by the dynamic structured light pattern in the region of interest, which may conserve battery power. In contrast, if the image contains a low contrast value in a region of interest, the DCA may increase the amount of texture provided by the dynamic structured light pattern to increase the accuracy of depth measurements. In some embodiments, the contrast may be normalized to the local noise level in the image. Many algorithms for calculating contrast are known in the art, such as Weber contrast, Michelson contrast, RMS contrast, etc. The DCA may define a contrast at each pixel (i,j). In some embodiments, the DCA may calculate the contrast using an L2 Contrast with Sliding Max algorithm.

In order to perform the L2 Contrast with Sliding Max algorithm, the DCA may first calculate 720 the pixel-wise contrast. The pixel-wise contrast may be calculated using the formula:

$$RawContrast_{i,j} = \sqrt{\left[\frac{(I_{i,j+1} - I_{i,j})^2}{2(I_{i,j+1} + I_{i,j})}\right]^2 + \left[\frac{(I_{i+1,j} - I_{i,j})^2}{2(I_{i+1,j} + I_{i,j})}\right]^2} \quad (1)$$

where $I_{i,j}$ is the Digital numbers of sensor pixel (i,j), and where i and j are integer values representing the i-th column and j-th row of a pixel in an image sensor.

Second, the DCA may calculate 730 the sliding-window maximum of the raw contrast. The sliding-window maximum of the raw contrast may be calculated using the formula:

$$Contrast_{i,j} = \max[RawContrast_{k,l}] \quad (2)$$

$$k \in [i-w, i+w], l \in [j-w, j+w]$$

where w controls the size of the sliding window (the window size is 2w+1 by 2w+1 in pixels). k and l are integer values representing the k-th column and l-th row of a pixel that is within the sliding window. The L2 Contrast with Sliding Max algorithm has shown a good correlation with the depth performance. Thus, the DCA may use the results of the contrast algorithm to identify regions where a higher or lower level of illumination may be desirable, and the DCA may use the results to update illumination instructions, as described with respect to step 640 in FIG. 6.

Figure 8:
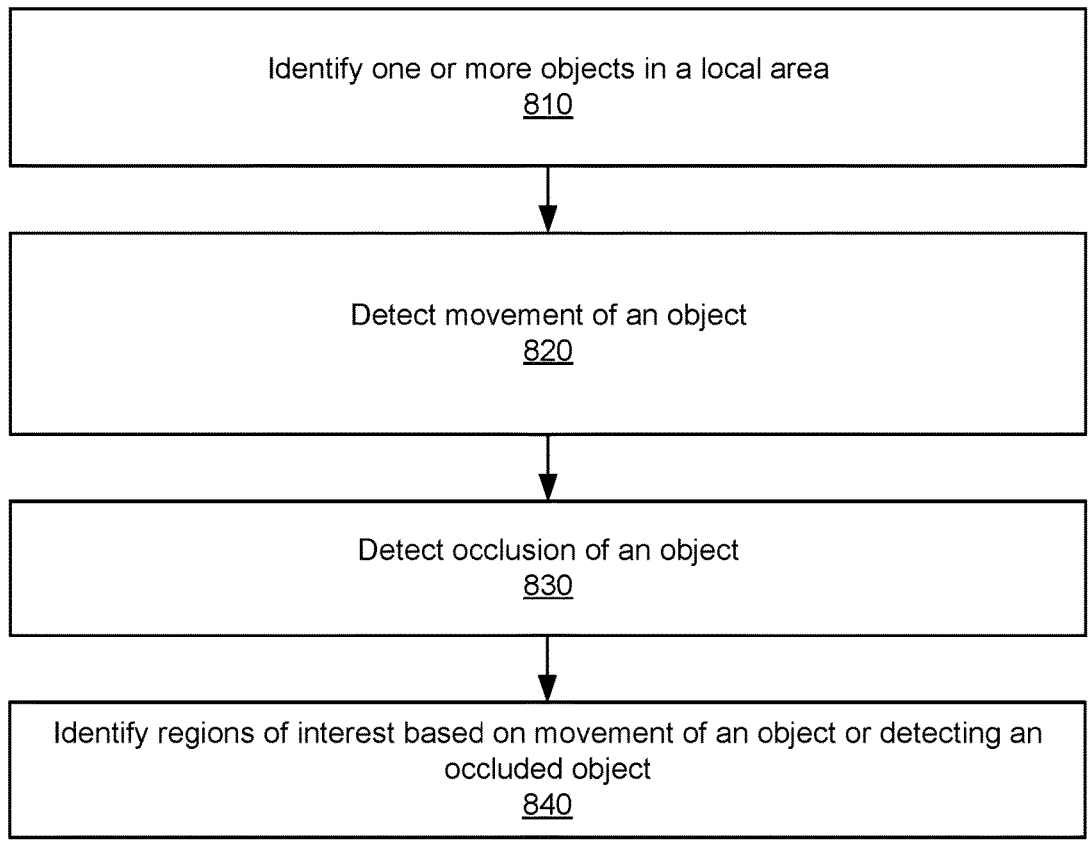
FIG. 8 is a flowchart illustrating a process for identifying regions of interest based on object locations, in accordance with one or more embodiments.

FIG. 8 is a flowchart illustrating a process 800 for identifying regions of interest based on object locations, in accordance with one or more embodiments. In some embodiments, the process may be all or a portion of step 630 described with respect to FIG. 6.

The DCA may identify 810 one or more objects in a local area. In some embodiments, the DCA may receive locations of objects from a mapping server. However, in some embodiments the DCA may detect objects based on local depth confidence metrics, which may be estimated on the headset, via connected devices, via the cloud, or estimated locally based on stacked sensor logic.

The DCA may detect 820 movement of an object. In some embodiments, the DCA may detect the movement based on a change in depth information in a portion of the local area. In some embodiments, the headset containing the DCA may detect motion using other sensors on the headset, such as visible light or infrared image sensors, image sensors used as inputs for SLAM, color RGB sensors used for image capture, texture capture, environmental reconstruction, audio sensors, telepresence, IMU sensor data, dynamic vision sensors, etc., that detect objects moving in the scene. The movement of the object may indicate to the DCA that the DCA should increase an amount of texture projected in a region of interest containing the object.

The DCA may detect 830 occlusion of an object. The DCA may determine that two or more objects are located in a same line of sight from the DCA. For example, based on information provided by the mapping server, or depth information determined by the DCA, the DCA may determine that two or more objects are located in the same line of sight. Based on the depth information for the two or more objects, the DCA determine that an object closest to the DCA occludes any objects located farther from the DCA in the same line of sight. An occluded object may be located behind another object in the local area relative to a line of sight from the headset. In some embodiments, a virtual object may be located between the headset and a physical object, occluding the physical object. In some embodiments, a physical object may be located between the headset and a virtual object, occluding the virtual object. Similarly, in some embodiments a physical object may occlude another physical object, or a virtual object may occlude another virtual object.

The DCA may identify 840 regions of interest based on movement of an object or detecting an occluded object. For example, in response to an object moving, the DCA may identify the object as being located within a region of interest. The DCA may determine to increase an amount of texture in the region of interest containing the moving object. In some embodiments, in response to detecting that an object is occluded, the DCA may identify the occluded object as being located within a region of interest. The DCA may determine to decrease an amount of texture in the region of interest containing the occluded object. For example, instead of projecting structured light with sufficient texture to obtain depth measurements at the distance of the occluded object, the DCA may decrease the amount of texture to a level sufficient to obtain measurements at the lesser distance of the object occluding the occluded object. The identified regions of interest may be used to update illumination instructions, as described with respect to step 640 of FIG. 6.

System Environment

Figure 9:
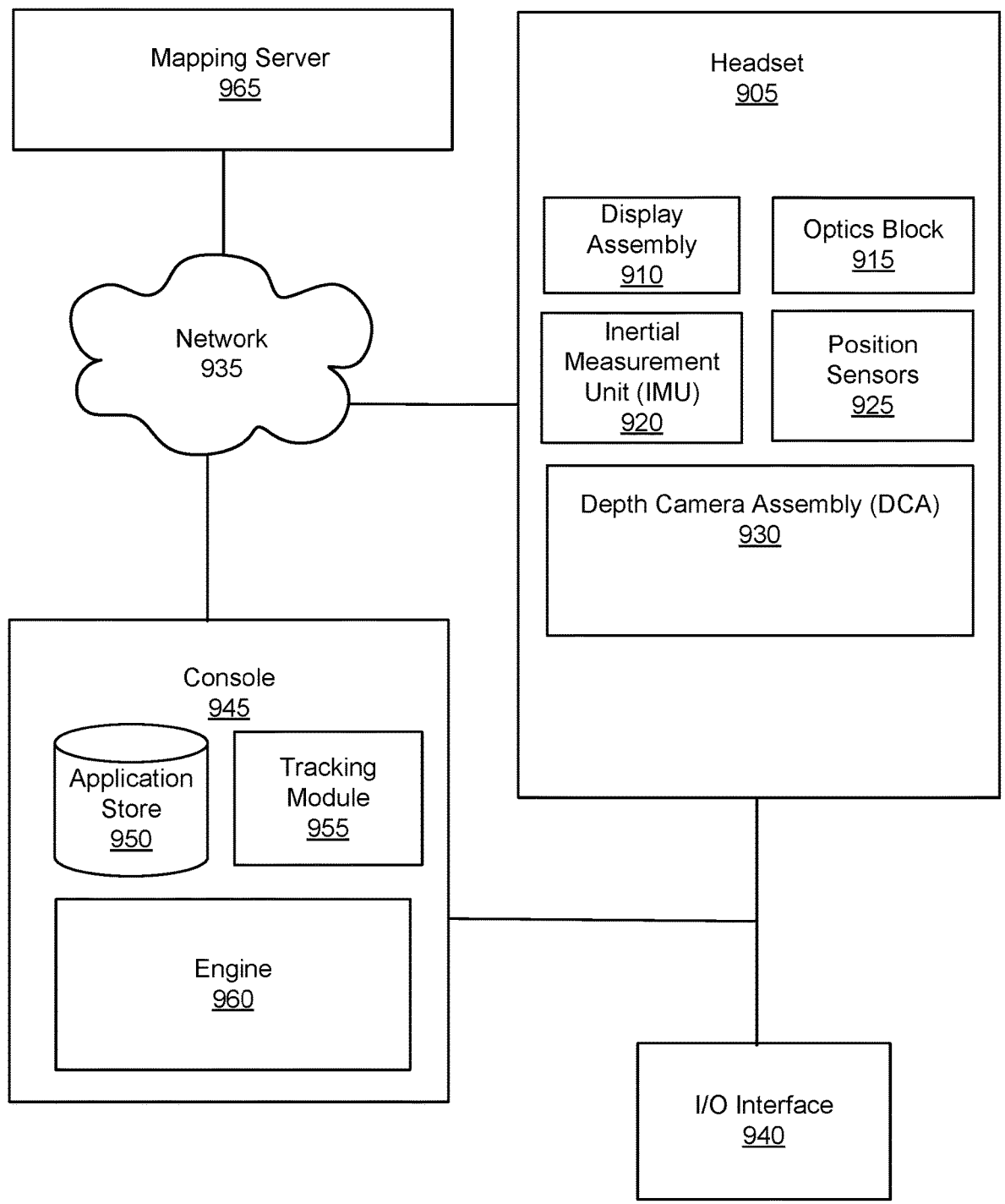
FIG. 9 is a block diagram of a system environment that includes a headset and a mapping server, in accordance with one or more embodiments.

FIG. 9 is a system environment 900 of a headset 905, in accordance with one or more embodiments. In some embodiments, the headset 905 may be the headset 905 of FIG. 1A. The system 900 may operate in an artificial reality environment, e.g., a virtual reality, an augmented reality, a mixed reality environment, or some combination thereof. The system 900 shown by FIG. 9 includes the headset 905, the network 935, the mapping server 965, and an input/output (I/O) interface 940 that is coupled to a console 945. While FIG. 9 shows an example system 900 including one headset 905 and one I/O interface 940, in other embodiments any number of these components may be included in the system 900. For example, there may be multiple headsets each having an associated I/O interface 940, with each headset and I/O interface 940 communicating with the console 945. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the console 945 may be provided by the headset 905.

The headset 905 includes the display assembly 910, an optics block 915, one or more position sensors 925, the DCA 930, and an inertial measurement unit (IMU) 920. Some embodiments of headset 905 have different components than those described in conjunction with FIG. 9. Additionally, the functionality provided by various components described in conjunction with FIG. 9 may be differently distributed among the components of the headset 905 in other embodiments, or be captured in separate assemblies remote from the headset 905.

The display assembly 910 may include an electronic display that displays 2D or 3D images to the user in accordance with data received from the console 945. The lenses 110 of FIG. 1 may be embodiments of the display assembly 910. In various embodiments, the display assembly 910 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof. The lens 110 is an embodiment of the display assembly 910. Note in some embodiments, the lens 110 may also include some or all of the functionality of the optics block 910

The optics block 915 magnifies image light received from the electronic display, corrects optical errors associated with the image light, and presents the corrected image light to a user of the headset 905. In various embodiments, the optics block 915 includes one or more optical elements. Example optical elements included in the optics block 915 include: an aperture, a Fresnel lens, a convex lens, a concave lens, a filter, a reflecting surface, or any other suitable optical element that affects image light. Moreover, the optics block 915 may include combinations of different optical elements. In some embodiments, one or more of the optical elements in the optics block 915 may have one or more coatings, such as partially reflective or anti-reflective coatings.

Magnification and focusing of the image light by the optics block 915 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 915 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 915 corrects the distortion when it receives image light from the electronic display generated based on the content.

The IMU 920 is an electronic device that generates data indicating a position of the headset 905 based on measurement signals received from one or more of the position sensors 925. A position sensor 925 generates one or more measurement signals in response to motion of the headset 905. Examples of position sensors 925 include: one or more accelerometers, one or more gyroscopes, one or more magnetometers, another suitable type of sensor that detects motion, a type of sensor used for error correction of the IMU 920, or some combination thereof. The position sensors 925 may be located external to the IMU 920, internal to the IMU 920, or some combination thereof.

The DCA 930 generates depth information of a local area, such as a room. The DCA 930 may be an embodiment of the DCA 300 of FIG. 3. Depth information includes pixel values defining distance from the imaging device, and thus provides a (e.g., 3D) mapping of locations captured in the depth information. The DCA 930 includes a light projector, one or more imaging devices, and a controller. The light projector may project a dynamic structured light pattern or other light that is reflected off objects in the local area, and captured by the imaging device to generate the depth information.

For example, the light projector may project a plurality of structured light (SL) elements of different types (e.g. lines, grids, or dots) onto a portion of a local area surrounding the headset 905. In various embodiments, the light projector comprises an illumination source and a pattern plate. The illumination source may comprise one or more emitters configured to illuminate the pattern plate with light (e.g., infrared light). The illuminated pattern plate projects a SL pattern comprising a plurality of SL elements into the local area. For example, each of the SL elements projected by the illuminated pattern plate is a dot associated with a particular location on the pattern plate.

Each SL element projected by the DCA 930 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 930 deforms as it encounters various surfaces and objects in the local area. The one or more imaging devices are each configured to capture one or more images of the local area. Each of the one or more images captured may include a plurality of SL elements (e.g., dots) projected by the light projector and reflected by the objects in the local area. Each of the one or more imaging devices may be a detector array, a camera, or a video camera.

The DCA 930 generates the depth information based on light captured by the DCA 930. The controller 930 may further provide the depth information to the console 945, an audio controller, or some other component.

The DCA may include a PCA comprising one or more passive imaging devices that generate color (e.g., RGB) image data. The PCA captures light from the environment of a local area to generate image data. Rather than pixel values defining depth or distance from the imaging device, the pixel values of the image data may define the visible color of objects captured in the imaging data. In some embodiments, the PCA includes a controller that generates the color image data based on light captured by the passive imaging device. In some embodiments, the DCA 930 and the PCA share a common controller. For example, the common controller may map each of the one or more images captured in the visible spectrum (e.g., image data) and in the infrared spectrum (e.g., depth information) to each other. In one or more embodiments, the common controller is configured to, additionally or alternatively, provide the one or more images of the local area to the audio controller or the console 945.

The I/O interface 940 is a device that allows a user to send action requests and receive responses from the console 945. An action request is a request to perform a particular action. For example, an action request may be an instruction to start or end capture of image or video data, or an instruction to perform a particular action within an application. The I/O interface 940 may include one or more input devices. Example input devices include: a keyboard, a mouse, a game controller, or any other suitable device for receiving action requests and communicating the action requests to the console 945. An action request received by the I/O interface 940 is communicated to the console 945, which performs an action corresponding to the action request. In some embodiments, the I/O interface 940 includes the IMU 920, as further described above, that captures calibration data indicating an estimated position of the I/O interface 940 relative to an initial position of the I/O interface 940. In some embodiments, the I/O interface 940 may provide haptic feedback to the user in accordance with instructions received from the console 945. For example, haptic feedback is provided when an action request is received, or the console 945 communicates instructions to the I/O interface 940 causing the I/O interface 940 to generate haptic feedback when the console 945 performs an action.

The console 945 provides content to the headset 905 for processing in accordance with information received from one or more of: the DCA 930, the headset 905, and the I/O interface 940. In the example shown in FIG. 9, the console 945 includes an application store 950, a tracking module 955, and an engine 960. Some embodiments of the console 945 have different modules or components than those described in conjunction with FIG. 9. Similarly, the functions further described below may be distributed among components of the console 945 in a different manner than described in conjunction with FIG. 9. In some embodiments, the functionality discussed herein with respect to the console 945 may be implemented in the headset 905, or a remote system.

The application store 950 stores one or more applications for execution by the console 945. An application is a group of instructions, that when executed by a processor, generates content for presentation to the user. Content generated by an application may be in response to inputs received from the user via movement of the headset 905 or the I/O interface 940. Examples of applications include: gaming applications, conferencing applications, video playback applications, or other suitable applications.

The tracking module 955 calibrates the local area of the system 900 using one or more calibration parameters and may adjust one or more calibration parameters to reduce error in determination of the position of the headset 905 or of the I/O interface 940. For example, the tracking module 955 communicates a calibration parameter to the DCA 930 to adjust the focus of the DCA 930 to more accurately determine positions of SL elements captured by the DCA 930. Calibration performed by the tracking module 955 also accounts for information received from the IMU 920 in the headset 905 and/or an IMU 920 included in the I/O interface 940. Additionally, if tracking of the headset 905 is lost (e.g., the DCA 930 loses line of sight of at least a threshold number of the projected SL elements), the tracking module 955 may re-calibrate some or all of the system 900.

The tracking module 955 tracks movements of the headset 905 or of the I/O interface 940 using information from the DCA 930, the one or more position sensors 925, the IMU 920 or some combination thereof. For example, the tracking module 955 determines a position of a reference point of the headset 905 in a mapping of a local area based on information from the headset 905. The tracking module 955 may also determine positions of an object or virtual object. Additionally, in some embodiments, the tracking module 955 may use portions of data indicating a position of the headset 905 from the IMU 920 as well as representations of the local area from the DCA 930 to predict a future location of the headset 905. The tracking module 955 provides the estimated or predicted future position of the headset 905 or the I/O interface 940 to the engine 960.

The engine 960 executes applications and receives position information, acceleration information, velocity information, predicted future positions, or some combination thereof, of the headset 905 from the tracking module 955. Based on the received information, the engine 960 determines content to provide to the headset 905 for presentation to the user. For example, if the received information indicates that the user has looked to the left, the engine 960 generates content for the headset 905 that mirrors the user's movement in a virtual local area or in a local area augmenting the local area with additional content. Additionally, the engine 960 performs an action within an application executing on the console 945 in response to an action request received from the I/O interface 940 and provides feedback to the user that the action was performed. The provided feedback may be visual or audible feedback via the headset 905 or haptic feedback via the I/O interface 940.

Additional Configuration Information

Embodiments according to the invention are in particular disclosed in the attached claims directed to a method, an apparatus, and a storage medium, wherein any feature mentioned in one claim category, e.g. method, can be claimed in another claim category, e.g. apparatus, storage medium, system, and computer program product, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, one or more computer-readable non-transitory storage media may embody software that is operable when executed to perform a method according to or within any of the above-mentioned embodiments.

In an embodiment, a system may comprise: one or more processors; and at least one memory coupled to the processors and comprising instructions executable by the processors, the processors operable when executing the instructions to perform a method according to or within any of the above-mentioned embodiments.

In an embodiment, a computer program product, preferably comprising a computer-readable non-transitory storage media, may be operable when executed on a data processing system to perform a method according to or within any of the above-mentioned embodiments.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   a structured light (SL) projector configured to project one or more SL patterns, each SL pattern having a respective pattern element density, into a local area in accordance with illumination instructions;
   a camera assembly configured to capture images of a portion of the local area including the one or more SL patterns; and
   a controller configured to:
      provide first illumination instructions to the SL projector, wherein the first illumination instructions cause the SL projector to project a first SL pattern having a first pattern element density into a first region of interest based on a first amount of contrast in luminance or color in the first region of interest, and
      provide second illumination instructions to the SL projector, wherein the second illumination instructions cause the SL projector to project a second SL pattern having a second pattern element density into a second region of interest based on a second amount of contrast in luminance or color in the second region of interest, wherein the second amount of contrast is greater than the first amount of contrast and the second pattern element density is different than the first pattern element density.

2. The DCA of claim 1, wherein the controller is further configured to:
   transmit, to a mapping server, a location of the DCA, wherein the mapping server stores a virtual model describing a plurality of physical spaces;
   receive, from the mapping server, the first amount of contrast for the first region of interest; and
   receive, from the mapping server, the second amount of contrast for the second region of interest.

3. The DCA of claim 2, wherein the mapping server is configured to determine the first amount of contrast based on a virtual model of the local area.

4. The DCA of claim 2, wherein the controller is configured to identify the first region of interest and the second region of interest based on parameters received from the mapping server.

5. The DCA of claim 1, wherein the controller is configured to identify the first region of interest in the local area based on detecting movement of an object within the first region of interest.

6. The DCA of claim 1, wherein the controller is configured to:
   identify the first region of interest in the local area based on detecting an occluded object within the first region of interest; and
   decrease an amount of texture in the first region of interest in response to detecting the occluded object, wherein the occluded object is a physical object, and wherein the physical object is occluded by a virtual object.

7. The DCA of claim 1, wherein the controller is configured to:
   determine an expected location of a virtual object within the local area; and
   select a power level for the first SL pattern based on the expected location of the virtual object.

8. The DCA of claim 1, wherein an intensity of the second SL pattern is different than an intensity of the first SL pattern.

9. The DCA of claim 1, wherein the controller is configured to transmit visual information describing a portion of the local area to a mapping server.

10. The DCA of claim 1, wherein the controller is configured to:
    subtract a first image captured without any SL pattern from a second image containing one of the SL patterns; and
    determine, based on the subtraction, a background level of IR illumination.

11. A method comprising:
    providing first illumination instructions to a structured light (SL) projector, wherein the first illumination instructions cause the SL projector to project a first SL pattern having a first pattern element density into a first region of interest based on a first amount of contrast in luminance or color in the first region of interest; and providing second illumination instructions to the SL projector, wherein the second illumination instructions cause the SL projector to project a second SL pattern having a second pattern element density into a second region of interest based on a second amount of contrast in luminance or color in the second region of interest, wherein the second amount of contrast is greater than the first amount of contrast and the second pattern element density is different than the first pattern element density.

12. The method of claim 11, further comprising:
transmitting a location of a local area including the first region of interest and the second region of interest to a mapping server, wherein the mapping server stores a virtual model describing a plurality of physical spaces;
receiving, from the mapping server, the first amount of contrast for the first region of interest; and
receiving, from the mapping server, the second amount of contrast for the second region of interest.

13. The method of claim 12, wherein the mapping server is configured to determine the first amount of contrast based on a virtual model of the local area.

14. The method of claim 12, further comprising identifying the first region of interest and the second region of interest based on parameters received from the mapping server.

15. The method of claim 12, further comprising:
identifying the first region of interest in the local area based on detecting movement of an object within the first region of interest.

16. The method of claim 12, further comprising:
identifying the first region of interest in the local area based on detecting an occluded object within the first region of interest.

17. The method of claim 16, further comprising:
decreasing an amount of texture in the first region of interest in response to detecting the occluded object.

18. The method of claim 17, wherein the occluded object is a physical object, and wherein the physical object is occluded by a virtual object.

19. The method of claim 11, further comprising transmitting visual information describing a portion of a local area to a mapping server.

20. A non-transitory computer-readable storage medium having instructions encoded thereon that, when executed by a processor, cause the processor to perform operations comprising:
providing first illumination instructions to a structured light (SL) projector, wherein the first illumination instructions cause the SL projector to project a first SL pattern having a first pattern element density into a first region of interest based on a first amount of contrast in luminance or color in the first region of interest; and
provide second illumination instructions to the SL projector, wherein the second illumination instructions cause the SL projector to project a second SL pattern having a second pattern element density into a second region of interest based on a second amount of contrast in luminance or color in the second region of interest, wherein the second amount of contrast is greater than the first amount of contrast and the second pattern element density is different than the first pattern element density.

* * * * *